April 23, 1963 W. J. FOWLER 3,086,604
CONTROL CIRCUITS FOR WEIGHT CHECKING APPARATUS
Filed May 31, 1960 4 Sheets-Sheet 1
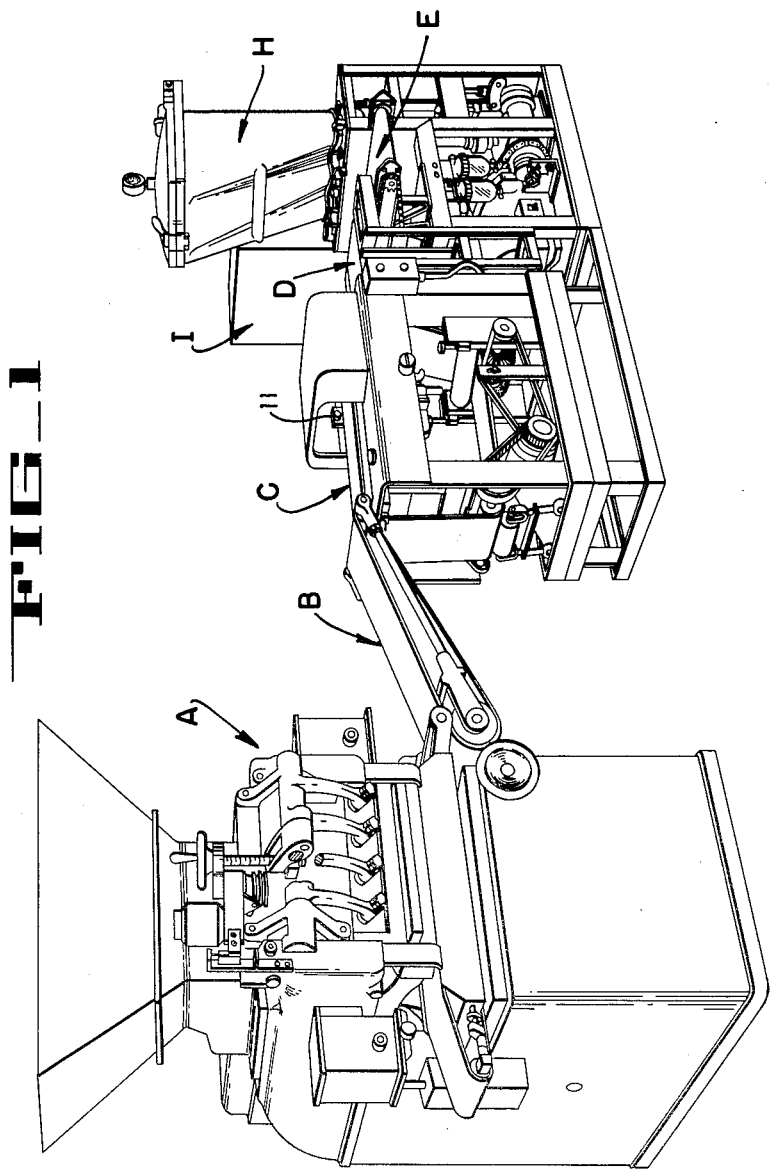
FIG_1
INVENTOR
WILLIAM J. FOWLER
BY Hans G. Hoffmeister.
ATTORNEY

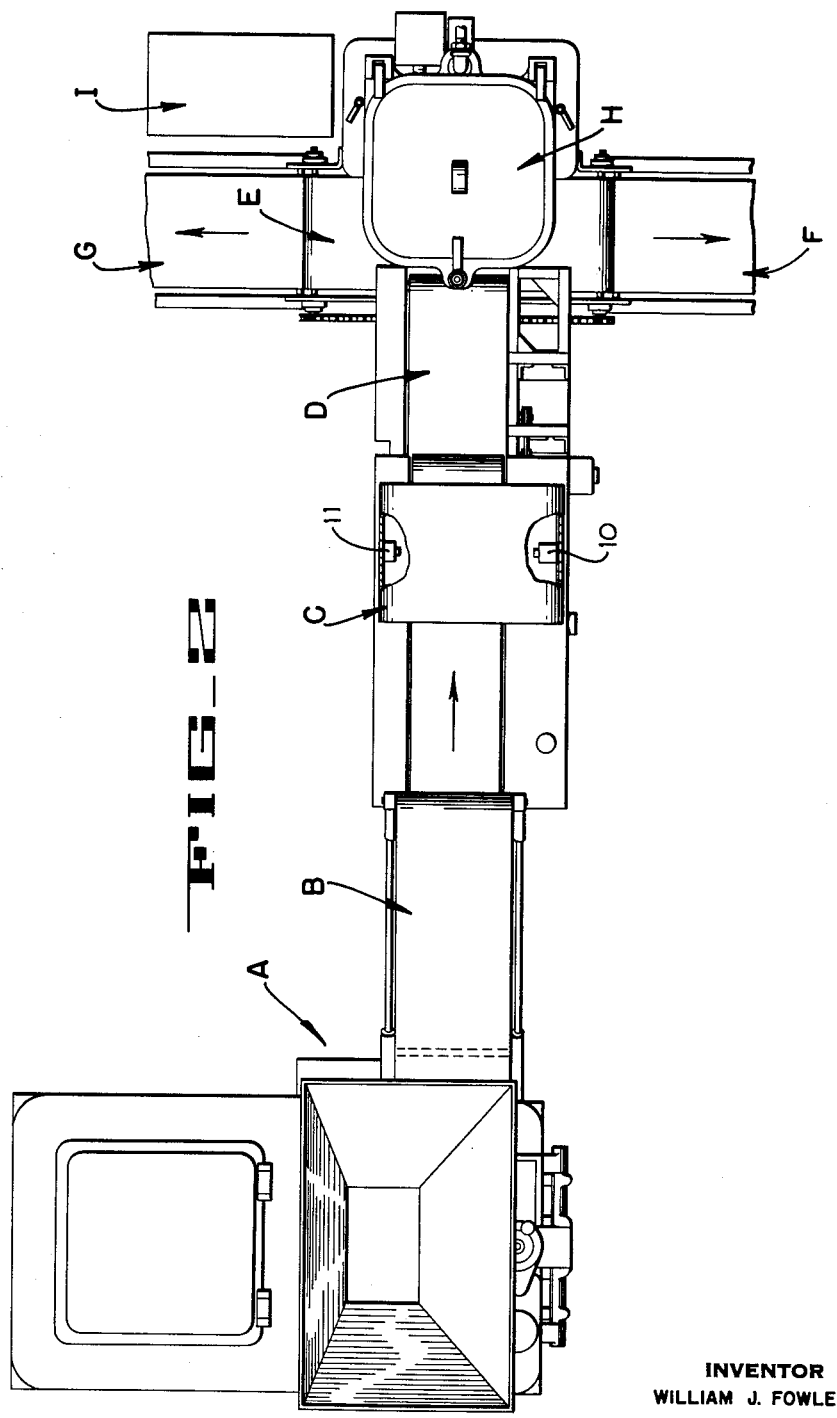

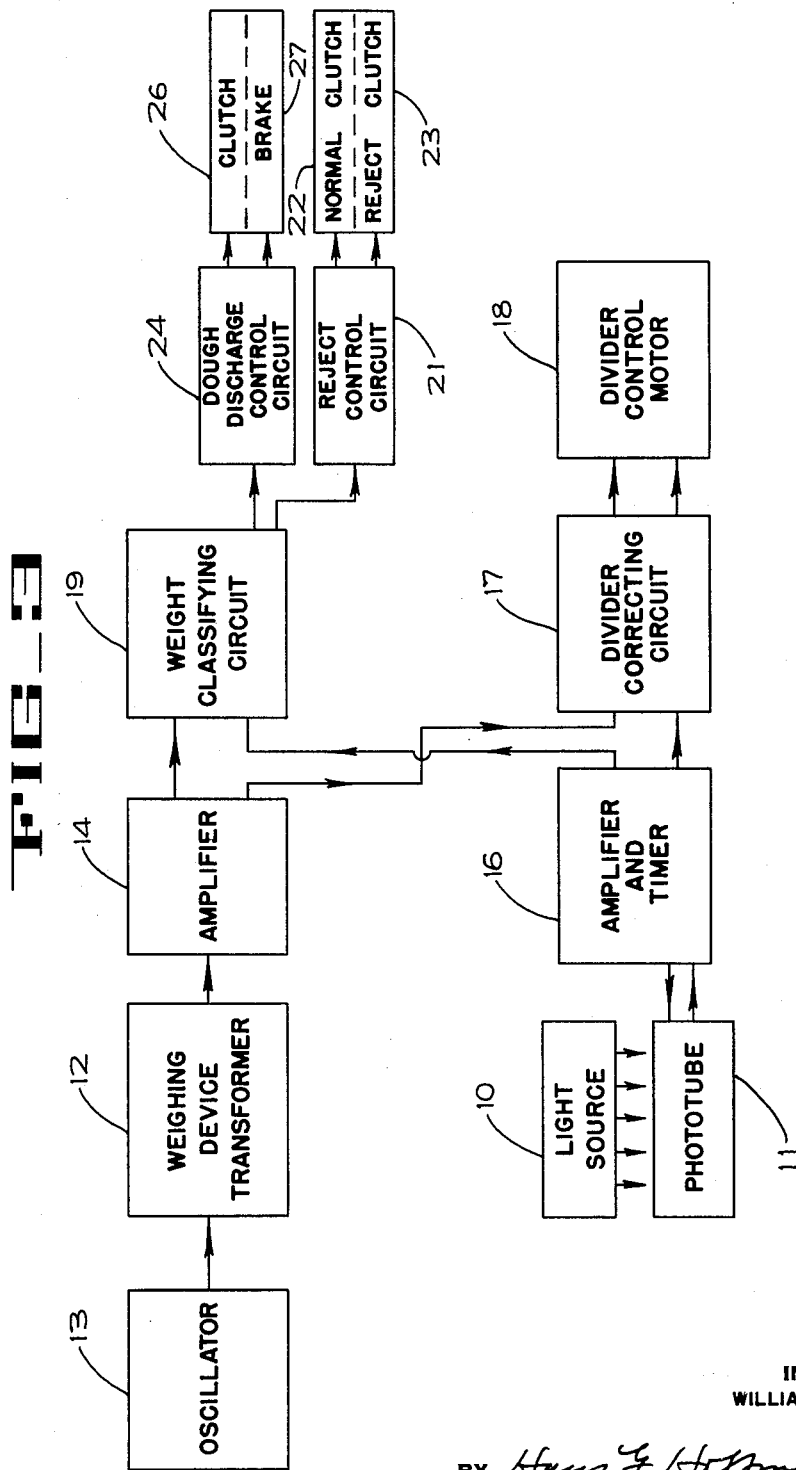

April 23, 1963
W. J. FOWLER
3,086,604
CONTROL CIRCUITS FOR WEIGHT CHECKING APPARATUS
Filed May 31, 1960
4 Sheets-Sheet 4
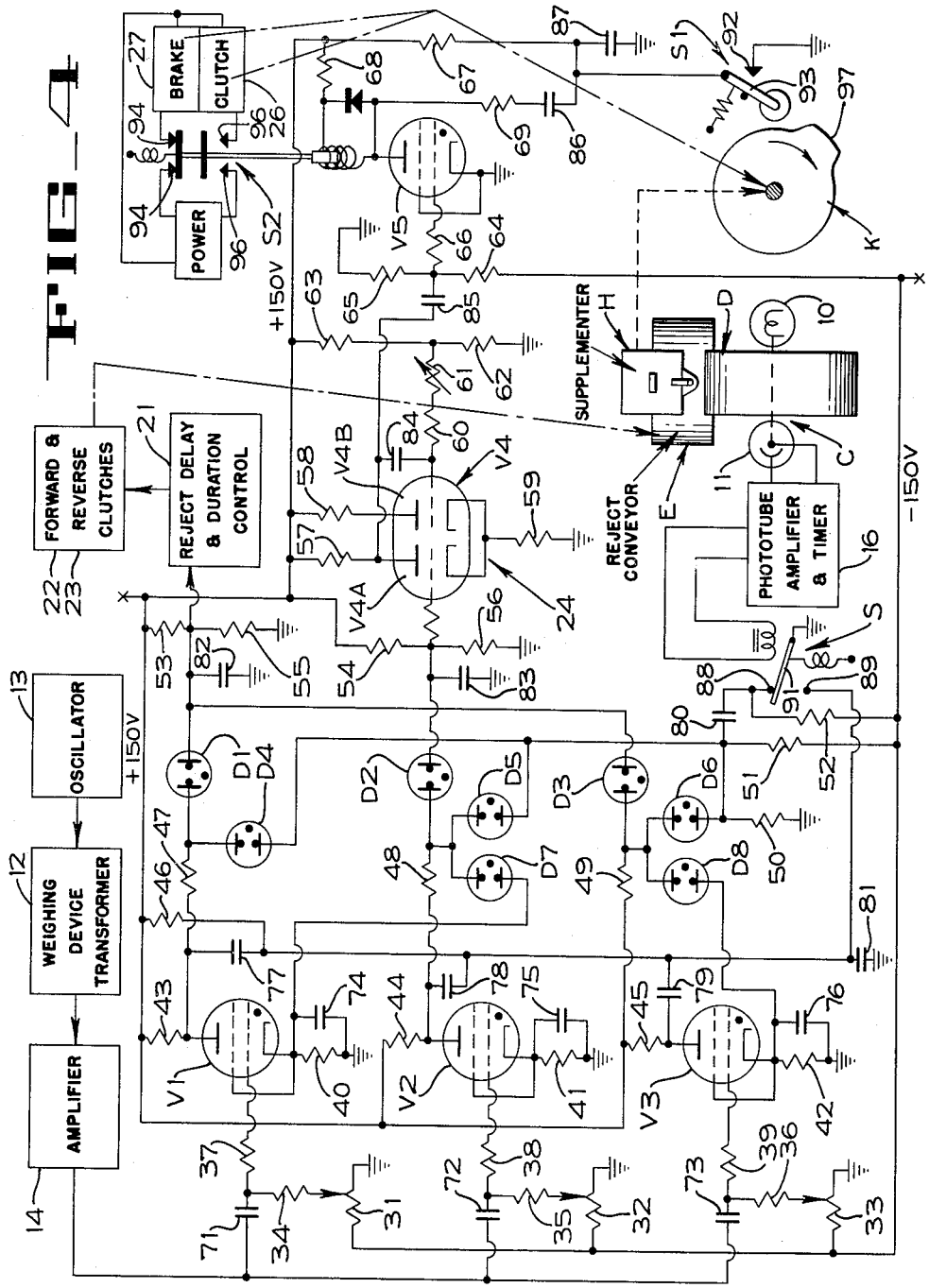
INVENTOR
WILLIAM J. FOWLER
BY Hans G. Hofmeister.
ATTORNEY United States Patent Office 3,086,604
Patented Apr. 23, 1963

3,086,604
CONTROL CIRCUITS FOR WEIGHT CHECKING APPARATUS
William J. Fowler, San Jose, Calif., assignor to FMC Corporation, a corporation of Delaware
Filed May 31, 1960, Ser. No. 32,749
6 Claims. (Cl. 177—60)

This invention relates to weight checking apparatus and more particularly to control circuits for weight checking apparatus that provide improved and more reliable operation than prior circuits of this type.

The invention will be described in connection with a continuous weighing, classifying and correcting system working with pieces of dough. In accordance with the system of this invention, pieces of dough are continuously supplied by a primary dough divider and are classified into four general categories by weight, as follows:

(1) Pieces that are under a certain minimum weight, that is, pieces that "uncorrectably underweight."
(2) Pieces that are above the minimum weight, but below a prescribed weight, that is, pieces that are "correctably underweight."
(3) Pieces that are at a prescribed weight.
(4) Pieces that are above the prescribed weight.

The invention includes a circuit having a number of thyratrons and glow tubes that operate to reject articles of category 1, correct or supplement articles of category 2, pass articles of category 3, and reject articles of category 4. The glow tubes are connected so as to cooperate in a novel manner to produce these results, the glow tubes being associated with a series of progressively biased thyratrons that receive weight signals from an automatic scale device. The classifying circuit of the invention, which may be termed a logic circuit, requires no relays, is dependable, and has a long life.

The increment adding or dough supplementing circuit, that operates on articles of category 2, above, includes a thyratron controlled relay, which relay controls a brake and a one revolution clutch for operating the dough supplementing or adding device.

Another feature and advantage of the circuit of this invention is that the extinguishing circuit and system for this thyratron is rendered free of difficulties that might otherwise be encountered due to slightly erratic operation of the supplementing mechanism clutch and brake units.

Other features and advantages of the present invention will become apparent from the following description and the accompanying drawings, in which:

FIG. 1 is a perspective view of a weight checking, dough supplementing and reject apparatus illustrated in association with a primary dough dividing machine.

FIG. 2 is a plan of the weight checking and correcting apparatus shown with the dough dividing machine.

FIG. 3 is a block diagram of the electronic control circuits and certain mechanical elements of a system embodying the present invention.

FIG. 4 is a schematic of the classifier and corrector circuit with certain mechanical elements shown diagrammatically.

GENERAL ARRANGEMENT

FIGS. 1 and 2 illustrate a conventional primary dough dividing machine A that forms individual measured pieces of dough from a mass of dough, each individual piece being adapted to be formed into a single article, such as a loaf of bread.

The machine A deposits the measured pieces of dough in succession onto a continuously operated conveyor B, which is inclined upwardly and away from the dough dividing machine A. The conveyor B feeds the spaced pieces of dough in succession onto a weight checking apparatus C, which includes a continuously driven conveyor that continues to advance the pieces of dough in the same direction. The weight checking apparatus C weighs the continuously advancing pieces of dough individually and transmits successive voltage signals that are respectively representative of the weight of the successively weighed pieces of dough. The entry of a piece of dough into the weight checking apparatus C is sensed by the interruption of a beam of light directed by a lamp 10 to a phototube 11.

The pieces of dough are advanced from the weight checking apparatus C onto a continuously operated transfer conveyor D, which feeds the pieces of dough to a reversible, combined pass and reject conveyor E. When the pieces of dough are discharged onto the reversible conveyor E, they are continuously advanced transversely of the conveyor D, in one direction when the weight of the piece of dough falls within predetermined limits to pass the dough for subsequent processing or in the opposite direction, when the weight of the piece of dough is above or below said limits, to reject the dough. The reversible conveyor E is driven at a sufficient speed relative to the spacing between successive pieces of dough so that at any given time only one piece of dough is being transported by the reversible conveyor. At each end of the conveyor E are take-away conveyors G and F (FIG. 2) for the passed and rejected material respectively.

Disposed adjacent the reversible conveyor E and spaced from the weight checking apparatus C is an apparatus H for forming and discharging relatively small supplemental quantities of dough. When the main piece of dough, that was formed by the dough divider A and is advancing on conveyor D for discharge onto the reversible conveyor E, is deficient in weight within a predetermined range, the dough increment-adding or supplementing apparatus H is automatically operated to deposit onto such an underweight piece of dough a selected quantity of supplemental dough, commensurate with the amount the piece of dough is deficient in weight. The apparatus H may be arranged to selectively provide supplemental increments of dough in several different sizes, but for the purposes of this invention, a supplementing apparatus arranged to discharge a supplemental piece of dough of but one size will suffice.

The foregoing apparatus and units (except for the primary dough divider A) are described in detail in the pending application of John A. Abbott et al., S.N. 789,124, filed January 26, 1959. The assignee of the aforementioned application is also the assignee of the present application.

General Description of the Control System

Adjacent the dough supplementing apparatus H is a control unit I (FIG. 1) for mounting the components of electronic control circuits (FIG. 3) which receive the successive voltage signals transmitted by a weighing device transformer forming part of the weight checking apparatus C. The electronic control circuits perform several control operations in response to the voltage signals and in response to interruption of the light beam to the phototube by the advancement of pieces of dough on the weight checking apparatus C. One control operation is the adjustment of the primary dough dividing machine A, for correcting the weight of pieces of dough formed therein to compensate for a weight variation between a desired weight and the average weight of pieces of dough advancing successively across the weight checking apparatus C. This aspect of the apparatus is not part of the present invention and is described in detail in the aforesaid pending application.

Another operation of the electronic control circuits is the regulation of the direction of travel of the reversible conveyor E, mentioned above. In accordance with this invention, not only are pieces of dough that are below a certain minimum weight, and hence uncorrectable, rejected but pieces of dough that exceed a prescribed weight are also rejected. In this regard the classifying circuit of this invention is an improvement over that described in the aforesaid pending application as well as in the pending application of Roberts et al., S.N. 843,798 filed October 1, 1959 and assigned to the assignee of this application.

Still another operation of the electronic control circuits is that of controlling the operation of the dough supplementer or increment adder H. As mentioned, the electronic control circuits classify each of such pieces of dough into a weight group corresponding to (1) over the prescribed weight, (2) under a predetermined minimum weight, (3) the prescribed weight, and (4) a weight between the minimum and prescribed weights. In the latter case, the control circuit activates the dough discharging apparatus H, to deposit onto the main piece of dough a selected quantity of dough.

Referring to the block diagram of FIGURE 3, the weighing device transformer 12 is a linear variable control transformer, connected to the weight checking apparatus C. The control transformer is excited by an oscillator 13 and, for various positions of its core, the transformer provides successive voltage signals that are respectively representative of the weight of pieces of dough advancing in succession across the weight checking apparatus C. The voltage signals are fed to a suitable amplifier 14. Each piece of dough that advances across the weight checking apparatus C interrupts the beam of light projecting by the source of light 10 toward the phototube 11, which interruption occurs just before maximum deflection of the scale platform. When the beam of light is thus interrupted, the phototube transmits a control signal to operate a phototube amplifier and timing circuit 16.

As mentioned, the electronic control circuits also include a primary dough divider correcting circuit 17 that receives weight signals from amplifier 14. Correcting circuit 17 is connected to the primary divider control motor 18, but as mentioned, these units form no part of this invention.

Continuing the general description of the block diagram of FIG. 3, the weight classifying circuit 19 also controls the direction of travel of the reversible conveyor E and controls the operation of the dough increment-adding apparatus H. As previously stated, a predetermined time after the articles are weighed, the weight classifying circuit 19 is triggered by the phototube timing circuit 16 with which it acts in accordance with the successive voltage (weight) signals transmitted by the transformer 12. Thus the pieces of dough are treated in accordance with their weight.

When a piece of dough which is of the prescribed weight is advanced across the weight checking apparatus C, the weight classifying circuit 19 operates to prevent activation of a reject control circuit 21, so that a normally operated clutch 22 of the reversible conveyor E remains engaged at the time the piece of dough of the prescribed weight is discharged onto the reversible conveyor E. While the clutch 22 is engaged, the conveyor E advances the piece of dough to the pass conveyor G (FIG. 2) for further processing. The construction and operation of a suitable reversible conveyor E in conjunction and a suitable clutch 22, are described in detail in the above-mentioned application, S.N. 789,124.

In case a piece of dough weighs more than a predetermined maximum weight or less than a predetermined minimum weight, the weight classifying circuit 19 activates the reject control circuit 21. The activation of the reject control circuit 21 causes a reject clutch 23 of the reversible conveyor E to be engaged when such piece of dough is discharged onto the reversible conveyor E. When the reject clutch 23 is engaged, the direction of travel of the conveyor E is reversed and the piece of dough is discharged onto the reject conveyor F (FIG. 2). The reject clutch 23, as well as the reversing operation of the conveyor E, is also described in detail in the previously mentioned application, S.N. 789,124.

In the event a piece of dough of a weight in the correctible range between the prescribed weight and the predetermined minimum weight is advanced across the weight checking apparatus C, the weight classifying circuit 19 operates to prevent the activation of the reject control circuit 21. Thus, the normally operated clutch 22 is engaged at the time such a piece of dough is discharged onto the reversible conveyor E.

At the time the weight classifying circuit 19 operates to prevent the activation of the reject control circuit 21, it also classifies the piece of dough. If the piece of dough weighs less than the prescribed weight by an amount not in excess of a predetermined quantity, (such as 1 oz.) the weight classifying circuit 19 activates the dough discharge or supplementing control circuit 24. The dough discharge control circuit 24 causes a clutch 26 of the dough increment adder H to engage and causes a brake 27 of the increment adder to release. These actions occur in such a timed relation with the advancement of the continuously advancing piece of dough, that the dough increment-adder or supplementary apparatus H projects a measured quantity of dough, such as 1 oz., against the continuously advancing piece of dough before it is deposited on the reversible conveyor. Thus when this piece of dough is deposited on the reversible conveyor E, it has been corrected to meet the prescribed weight requirement. The structure and operation of the dough discharging apparatus H that performs the above operation is completely described in the aforesaid pending application, S.N. 789,124.

*General Description of the Classifying Circuit*

There is an overweight reject circuit illustrated in FIG. 4 that operates in a classifier circuit in conjunction with an underweight reject circuit, a supplementing, or add weight circuit, and a pass circuit. As described in detail in the aforesaid application S.N. 789,124 the supplementing, or add weight circuit may in fact include means for adding one, two, or three increments of dough to the main body of dough, but for the purposes of this invention the number of increments added is immaterial. Accordingly, only a single add weight circuit is shown. Since the glow tubes of the overweight reject circuit cooperate with those of the other circuits, the entire classifying circuit and its sequence of operation from underweight reject to overweight reject will be described.

Referring to FIG. 4, the grids of thyratrons V1, V2 and V3 are given progressively increasing negative biases through resistance networks including potentiometers 31, 32 and 33 connected to a negative voltage source of −150 volts D.C. The weight signals from the amplifier 14 connected to the weighing device transformer 12 are also applied to the grids of the thyratrons V1, V2 and V3 through the usual coupling condensers 71—73. The plates of the three thyratrons are each connected through the usual plate load resistor 43–45 to a source of positive voltage, which is plus 150 volts D.C. in this case. The power supply that supplies the positive and negative voltage sources may be of conventional design and the details thereof form no part of the invention. The cathodes of the thyratrons are connected to ground through the usual cathode bias resistors 40 to 42.

Forming part of the classifying or logic circuit is a set of three transfer glow tubes D1, D2 and D3. These may be conventional neon glow tubes. Transfer glow tubes D1 and D2 each have a first electrode, shown at the left side of the tubes, connected through resistors 47 and 48, respectively, directly to the plates of thyratrons V1 and V2, respectively. The corresponding electrode of transfer glow tube D3 connects through a resistor 49 to the positive voltage source. The other electrodes of the transfer glow tubes, shown at the right side of the tubes, receive a positive bias through resistors 53 and 54, but such bias is less than that applied to the first electrodes.

Associated with each transfer glow tube is a pulse glow tube having its upper electrode connected to the first or left hand electrode of the associated transfer glow tube. These pulse glow tubes are D4, D5 and D6, respectively. The lower electrodes of the pulse glow tubes connect to the source of negative voltage by means of a voltage divider formed of resistors 50 and 51 and these electrodes are also commonly connected to one plate of a pulse capacitor 80. The other plate of capacitor 80 is connected to both the negative 150 volt source through resistor 52, and to a fixed contact 88 of a relay control switch S. The other fixed contact 89 of the switch connects to a line that leads through condensers 77, 78, and 79, respectively, to the plates of the thyratrons and to one plate of a capacitor 81, the other plate of which is grounded. This line serves as a thyratron extinguishing circuit. Movable contact 91 of the switch S is connected to ground and can ground either the pulse capacitor 80 or the line to the thyratron plates.

The position of the contacts of the switch is normally that shown in FIG. 4, wherein contact 88, and hence the right hand plate of pulse capacitor 80, are connected to ground. This position is due to the fact that the relay switch S is normally energized, holding the movable contact in the position shown in FIG. 4. When the light beam of the phototube is interrupted by a piece of dough, the coil for the relay switch S is de-energized and the movable contact 91 shifts to ground out the lower fixed contact 89. As mentioned, this extinguishes all thyratrons V1—V3 that may have been conducting. There is a timer circuit built into the phototube amplifier, which circuit re-energizes the relay coil a predetermined length of time after the beam is cut by the piece of dough, whereupon the movable contact 91 again assumes the position shown in FIGURE 4, applying an instantaneous positive pulse across capacitor 80 because the right hand plate of the capacitor, formerly connected to the negative voltage source through resistor 51, is now placed at ground potential. Such a timer circuit is described in detail in the aforesaid pending applications. The length of the time delay is longer than the length of time during which the longest piece of dough normally encountered is in the path of the light beam so that, once the light beam is interrupted, the time delay assumes control and hence the time delay is constant for all pieces of dough.

The classification or logic circuit, in addition to the set of three transfer glow tubes and the set of three pulse glow tubes described, also includes two bypass glow tubes D7 and D8. Each of these has an upper electrode connected to the junction between the transfer and pulse glow tubes associated therewith. The other or lower electrode of bypass glow tube D7 connects directly to the cathode of thyratron V1, and the corresponding connection for bypass glow tube D8 is made to the cathode of thyratron V3. There is no bypass glow tube associated with the set of transfer and pulse glow tubes D1 and D4.

As can be seen in FIG. 4, the right electrode of transfer glow tube D1 connects to the reject delay and duration control 21 and, when this transfer glow tube D1 fires, a signal is given to the reject delay and duration control. This signal is stored in the control and causes the reversible conveyor E to change its direction and run in the reverse direction at the proper time, that is, at the time when the piece of dough being rejected reaches the conveyor. The duration control, that forms part of the circuit, insures that the conveyor will run in the reverse or reject direction long enough to clear the conveyor of the rejected piece of dough. The reject conveyor is shifted to the forward direction before the next piece of dough reaches the conveyor. The duration control circuit is described in detail in the aforesaid pending applications.

The right electrode of transfer glow tube D3 connects to the reject delay circuit, so that when this glow tube fires, the reject conveyor is operated to reject the piece of dough which, in this case, is a piece that is over the predetermined maximum or prescribed weight, and hence is uncorrectable by the supplementing mechanism. The right electrode of transfer glow tube D2 connects to the dough discharge control circuit 24, and when this glow tube is fired, an increment of dough will be added to the main piece of dough, and at the proper time.

Having completed a general description of the classifier circuit, the operation of the thyratrons and particularly the glow tubes under the various condition encountered will now be explained in more detail.

*Rejection of Underweight Dough*

When a piece of dough that is under the preselected minimum weight reaches the scale, the underweight piece of dough cuts the beam directed to phototube 11 causing the relay switch S to be de-energized and causing the movable contact 91 to leave the fixed contact 88 and engage the grounded contact 89. This extinguishes any thyratrons that might have been fired, and also applies a negative pulse across capacitor 80 which permits the 150 volt negative voltage supply to fire all three pulse glow tubes D4, D5 and D6. The preload of the scale, which is described in application S.N. 789,124, is such that little or no voltage signal is applied to the grids of the thyratrons by a sub-minimum weight piece of dough. Under these circumstances, all three thyratrons remain biased to cut off. After a time predetermined by the time delay portion of the phototube amplifier circuit, the coil of relay switch S is again energized, restoring the contacts to the position shown in FIG. 4, whereby fixed contact 88 is grounded. As previously mentioned, the resultant grounding of one plate of capacitor 80, that was previously connected to the negative voltage source through resistor 52, applies a positive pulse successively through all three pulse glow tubes D4, D5, and D6. Since these glow tubes have been fired, when the relay coil was de-energized by interruption of the light beam, this positive pulse is passed on by the pulse glow tubes and appears as an increase in potential at their upper plates and hence at the left electrodes of transfer glow tubes D1—D3. Referring to transfer glow tube D1, since the thyratron V1 is not firing, its plate is at source potential and this potential, plus the positive pulse voltage from pulse glow tube D4 is sufficient to fire transfer glow tube D1. This results in a reject signal for the uncorrectably underweight piece of dough.

However, no increment adding signal is produced by the uncorrectably underweight piece of dough. The positive pulse produced when the time delay circuit timed out, in passing through pulse glow tube D5 is passed on to the upper electrode of the associated bypass glow tube D7. The lower electrode of bypass glow tube D7 is connected to the cathode of thyratron V1, but that thyratron is extinguished so that the cathode is at ground potential. Under this condition the pulse is sufficient to fire bypass glow tube D7. When by-pass glow tube D7 fires, the voltage on the left electrode of transfer glow tube D2 drops and prevents the tube from firing in response to the pulse. Hence no increment adding signal can be relayed by transfer glow tube D2.

The same action occurs at bypass glow tube D8, which fires upon receipt of the pulse, and insures that transfer glow tube D3, the overweight reject tube, does not fire. However, since the underweight reject transfer glow tube D1 has fired, the uncorrectably underweight piece of dough will be rejected by the reversed conveyor E.

*Addition of Supplementary Dough*

Assume that a piece of dough is delivered that is under the prescribed weight, but still falls within a correctable range. When such piece of dough interrupts the beam of light to the phototube, and when it is weighed, the weight signal is sufficient to fire the "Add" thyratron V1. This time, when the positive pulse resulting from the operation of relay switch S to re-ground contact 88 is received, after the time delay, and is passed along through the pulse glow tubes, transfer glow tube D1 for the underweight reject conveyor will not fire. Transfer glow tube D1 does not fire because its left electrode is connected to the plate of thyratron V1. Since thyratron V1 is now conducting, its plate potential drops, and the voltage on the left electrode of the transfer glow tube D1 is reduced accordingly. The pulse is not adequate to fire glow tube D1 under this condition, and the reject circuit is not operated.

However, the transfer glow tube D2 associated with dough supplementing circuit does fire because the bypass glow tube D7, associated with transfer glow tube D2 is not fired by the pulse. This is because the lower electrode of bypass glow tube D7 connects directly to the cathode of thyratron V1, which is now conducting because of the "Add" signal received. This raises the potential of the thyratron cathode because of the current flow in cathode bias resistor 40 and hence raises the potential of the lower electrode of the bypass glow tube D7. Now the pulse is insufficient to fire bypass glow tube D7, but it can fire transfer glow tube D2. It is to be noted that the left electrode of the transfer glow tube D2 is connected to the plate of a thyratron that is not fired, namely thyratron V2, so that nothing tends to lower the potential of that electrode. Firing of transfer glow tube D2 gives a signal to the incrementing or adding circuit, to add a piece of dough to the piece of dough under classification.

Since the overweight reject thyratron remains cut off, transfer glow tube D3 is kept from firing by the firing of bypass glow tube D8, which occurs when the pulse is received. Thus this part of the circuit, like that associated with underweight reject transfer glow tube D1, gives no reject signal.

The Passing of Dough of Prescribed Weight

When a piece of dough of prescribed weight enters the scale, it interrupts the light beam to the phototube and is weighed. The apparatus is set so that when the piece of dough of prescribed weight is weighed, both thyratrons V1 and V2 will be fired. Firing of thyratron V1 holds underweight reject transfer glow tube D1 cut off as before, and no reject signal is given by transfer glow tube D1 when the pulse is received. Firing of thyratron V2 lowers the voltage at the left electrode of "Add" transfer glow tube D2, so that when the pulse is received, such pulse is insufficient to fire the transfer glow tube D2, and hence no increment adding signal is given.

The transfer glow tube D3, for the overweight reject circuit remains cut off as before, because thyratron V3 associated with bypass glow tube D8 remains cut off and bypass glow tube D8 is fired by the pulse, thereby keeping transfer glow tube D3 cut off. Thus none of the transfer glow tubes will fire and no signal to either the reject conveyor or the increment adder is provided, when thyratrons V1 and V2 are fired and thyratron V3 is not fired. In this case, the piece of dough passes along the reversible conveyor which remains running in its normal, or pass direction.

Rejection of Overweight Dough

When a piece of dough that is over the prescribed weight enters the scale, it interrupts the beam of light to the phototube and is weighed. Now the weight signal is sufficient to fire all three thyratrons. Since the left electrodes of transfer glow tubes D1 and D2 are connected to the plates of thyratrons V1 and V2 when these thyratrons are conducting, the transfer glow tubes D1 and D2 will not fire when the pulse is received because of the lowering of the plate potentials. However, transfer glow tube D3, connected to the reject conveyor circuit is connected differently, and it will fire when the pulse is received. In the first place, the left electrode of transfer glow tube D3 is not connected to a thyratron plate but rather is connected directly to the positive voltage source. Secondly, the lower electrode of bypass glow tube D8, associated with transfer glow tube D3, is connected directly to the cathode of thyratron V3. Since the thyratron V3 is now firing, this raises the voltage on the lower electrode of bypass glow tube D8, and prevents the pulse applied to the upper electrode from firing the bypass glow tube D8. Since the bypass glow tube D8 will not fire, the pulse will fire the associated transfer glow tube D3, sending a reject signal to the reversible conveyor. The positive bias voltage applied to the right electrodes of transfer glow tubes D1–D3 by the resistance elements 53, 55 and 54, 56, respectively, is selected to insure that the above-described operations will take place.

Thus it can be seen that the arrangement of glow tubes illustrated and described provides four basic operations. These are, an underweight reject operation, and adding or supplementing operation, a pass operation, and an overweight reject operation. This provides a reliable system capable of operating over a long period of time, without adjustment or loss of control.

Dough Supplementing Control

As previously mentioned, the invention also includes means for improving the reliability of the dough adding or supplementing mechanism. The supplementing mechanism includes alternately operable brake and one revolution clutch units, arranged to drive the supplementing mechanism one revolution upon receipt of a signal.

A clutch and brake control thyratron V5 is provided, and when the thyratron is fired, it energizes a relay switch S2, releasing the brake 27 and engaging the clutch 26 of the supplementing mechanism. Associated with the mechanism, as described in detail in application S.N. 789,124 is a cam such as cam K (FIG. 4) provided to automatically de-energize the clutch, and apply the brake after one revolution has been imparted to the drive shaft of the supplementing mechanism. In accordance with this invention, the cam performs its function in association with a normally open switch S1. When switch S1 is closed by the cam, it will extinguish the clutch and brake control thyratron V5.

Referring now to the circuit, there are two triodes V4A and V4B in a single envelope V4 that are connected to form a cathode-coupled monostable multivibrator. The connection is such that the right hand section V4B is normally conducting, and the left hand section V4A is normally cut off. The circuit remains stable in this condition until a pulse or signal is applied to the grid of the non-conducting section V4A. In the stable condition of the multivibrator, that is, with the section V4B conducting, the control thyratron V5, associated with the relay switch S2, is held cut off. This is because the grid of the thyratron V5 is negatively biased by a resistance network 64, 65, 66, from a source of negative voltage. This does not mean that a negative grid bias on the thyratron extinguishes the thyratron once it fires, but only that once the thyratron is extinguished, the negative grid bias holds the thyratron cut off.

It will be noted that the plate of normally cut off section V4A of the multivibrator is directly connected to the grid of normally conducting section V4B by a condenser 84, and that the same plate is connected to the grid of thyratron V5 by a condenser 85 and a grid resistor 66. When an increment adding signal is received by the grid of normally cut-off section V4A from the classifying circuit by means of transfer glow tube D2 firing, section V4A begins to conduct, lowering the plate potential. Such conduction applies a negative pulse to condenser 84, connected between the plate of section V4A and the grid of section V4B. The negative pulse drives the grid of section V4B negative and will almost instantly cut off section V4B. At the same time, a negative pulse is applied to the coupling condenser 85 connected to the thyratron grid resistor 66, but this has no effect because the thyratron was previously cut off.

A time delay network in the multivibrator circuit is formed by condenser 84, resistor 60, potentiometer 61 and resistor 62, which results in the multivibrator returning to its stable state after a predetermined length of time. The length of time, within limits set by the circuit constants, can be adjusted by adjusting potentiometer 61. As previously mentioned, when left hand section V4A conducts, the potential at its plate drops, lowering the potential on the associated plate of condenser 84 and initiating a relatively rapid discharge of the condenser. However, re-charging of condenser 84 begins immediately through resistor network 60—63 connected to the plus 150 volt source. After a length of time determined by the circuit constants and the setting of potentiometer 61, the grid of V4B again reaches a potential sufficiently positive to cause that section to conduct. This raises the potential of the cathodes and cuts off section V4A, which now has no grid signal, except for any small charge that might remain on a grid input condenser 83. Thus, in a short time, the multivibrator is restored to its stable state, with section V4B conducting, and with section V4A cut off, ready for the next signal. When the multivibrator shifts to its stable state, with section V4A shifting from conduction to cut off, the potential at the plate of section V4A goes more positive. This applies a strong positive pulse to both condensers 84 and 85. The positive pulse across condenser 84 has no effect, it merely insures that the right hand section of the multivibrator will remain conducting. However, the positive pulse across coupling condenser 85 drives the grid of thyratron V5 positive and the thyratron fires. Even though the right hand plate of coupling condenser 85 soon reaches a negative potential due to charging of the condenser, this does not cut off the thyratron V5, because once the thyratron V5 fires the grid thereof loses control.

Thus the dough supplementing system is actuated a predetermined length of time after the weight correction signal is developed at the scale platform, which length of time is adjusted to permit the piece of dough to travel from the scale platform to a supplementary zone adjacent to supplementary unit.

As mentioned previously, in the dough supplementing circuit there is a motor-driven, one revolution clutch 26 that engages when the relay switch S2 is energized to drive the supplementing device through one cycle. Also, there is a brake 27 that is released upon initiation of a cycle, and is engaged to bring the device to a stop upon completion of a cycle. A cycle is initiated by firing of the thyratron V5 in response to a signal, but is terminated by cam K and normally open switch S1. In normal operation, the cam and switch are in the position shown in FIGURE 4, with the lobe 97 of cam K having just passed under switch S1 to close it, and having then coasted enough to again clear the switch, permitting it to open before coming to rest.

The plus 150 voltage source, or plate supply, connects to the coil terminal of the relay S2 that is remote from the plate, through resistor 68. The other terminal of the relay coil connects directly to the plate of thyratron V5.

Also connected directly to the plate of the thyratron is a resistor 69. A lower plate of a pulse condenser 86 connects to the movable contact 93 of switch S1, the fixed contact 92 of the switch being grounded. In addition to the plate circuit, another resistor 67 connects to the plate supply and to the upper plate of a charging condenser 87, the lower plate of the charging condenser being grounded.

With this circuit, when switch S1 is open, as it is except when closed by lobe 97 on the cam, the lower plate of pulse condenser 86 soon comes to source potential. This is because with the switch open, the upper plate of charging condenser 87, which was formerly grounded by the switch, can now charge to source potential through resistor 67, and since the upper plate of charging condenser 87 connects directly to the lower plate of pulse condenser 86, the lower plate of condenser 86 also assumes source potential. The upper plate of pulse condenser 86 assumes the potential existing at the thyratron plate, which is source potential when the thyratron is cut off, and which is a much lower potential, such as 8 volts, when the thyratron is firing.

Thus, if it is assumed that the thyratron is firing, and that switch S1 has been open long enough to permit the lower plate of pulse condenser 86 to assume source potential, by means of the circuit described above, the grounding of the lower plate of pulse condenser 86, by closing of switch S1 near the end of the increment adding cycle, produces a strong negative pulse across pulse condenser 86, which negative pulse is passed on to the thyratron plate, cutting off the thyratron instantly.

To review a cycle of normal operation, assume that the cam is in the position of FIG. 4 with switch S1 open. Upon receipt of a positive pulse across coupling condenser 85 due to restoration of the multivibrator to its normal state, which occurs a predetermined length of time after the supplementing signal, thyratron V5 fires and the relay switch S2 is energized, opening a pair of normally closed contacts 94, and thereby releasing brake 27. Also a pair of normally open contacts 96, forming part of switch S2 are closed, engaging the clutch 26, which starts the operation of the supplementing device and also starts rotation of timing cam K. Toward the end of the supplementing cycle, the lobe 97 on cam K closes the normally open switch S1 to bring movable contact 93 of that switch against the grounded contact 92. This applies a negative pulse to the plate of thyratron V5 through pulse condenser 85 and resistor 69, extinguishing the thyratron. The relay switch S2 is now de-energized, which applies brake 27 and disengages the clutch 26, stopping the supplementing mechanism.

However, all these operations inherently include a certain time delay, so that as mentioned above, in normal operation the cam K will coast somewhat before it comes completely to rest. In normal operation, it is intended that the cam coast sufficiently so that lobe 97 thereof clears the movable contact 93 of switch S1, so that the switch will open and disconnect the pulse condenser 86, connected to the plate of the thyratron V5, from ground. With the pulse condenser disconnected from ground, the plate of thyratron V5 is instantly restored to firing voltage through the coil of switch S2 and resistor 68 connected to the plus 150 volt source, and the thyratron is ready to fire on receipt of another signal.

If the mechanical operation of the dough adding device is somewhat sluggish, so that the cam K cannot coast quite enough to cause lobe 97 to clear the switch S1, the switch S1 will remain closed. In accordance with this invention, such action will not interfere with the operation of the device, because even if the switch S1 happens to remain closed at the end of the cycle, the positive 150 volt D.C. source will have time to bring the plate of thyratron V5 up to firing voltage by re-charging the pulse condenser 86 through resistor 68, the relay coil, and resistor 69. Thus when the next positive signal is applied to the thyratron grid, the supplementing device is again operated, the switch S1 opens early in the cycle, and the lower plate of pulse condenser 86 and the upper plate of charging condenser 87 are both disconnected from ground. Since upper plate of charging condenser 87 is disconnected from ground, the condenser begins to charge and its upper plate is again brought up to source potential of 150 volts, through resistor 67. This also places the lower plate of pulse condenser 86 at source potential, so that the pulse condenser is now ready to apply another strong negative pulse to the thyratron plate, when lobe 97 of the cam again closes switch S1 near the end of a cycle, and grounds the lower plate of the pulse condenser. If normal operation is restored, the cam will coast so that the lobe 97 clears the switch, permitting it to open. If not, the lobe of the cam stops under the switch, holding it closed.

Thus even though switch S1 was left closed at the end of the cycle just completed, in a short period of time the plate of thyratron was brought up to firing voltage between signals, and restarting of the supplementing mechanism upon receipt of the next signal was not interfered with. Also, cut off of the thyratron at the end of the cycle was assured, because switch S1 opens early in the cycle, to bring the lower plate of the pulse condenser 86 to source potential. Even if the switch S1 is left closed again, a complete cycle of operation will occur upon receipt of the next signal.

However, the intended operation of the device is one wherein cam K coasts sufficiently so that switch S1 does open at the end of each cycle, thereby insuring instant application of firing voltage to the plate of thyratron V5 directly from the source voltage, through resistor 68 and the relay coil. The circuit will provide reliable operation until the difficulty with the mechanical aspects of the circuit have been corrected.

Table I gives suitable circuit constants for a typical embodiment of the invention.

TABLE I

| Resistors: | Value |
|---|---|
| 31–33 | 100K pot. |
| 34–39 | 1.8M. |
| 40–42, 50 | 10K. |
| 43–45, 58 | 22K. |
| 46 | 56K. |
| 47–49 | 680K. |
| 51 | 33K. |
| 52 | 180K. |
| 53, 54 | 8.2M. |
| 55, 56 | 1.2M. |
| 57, 67 | 100K. |
| 59 | 15K. |
| 60 | 220K. |
| 61 | 2M pot. |
| 62 | 390K. |
| 63 | 560K. |
| 64 | 1M. |
| 65 | 150K. |
| 66 | 4.7M. |
| 68 | 12K. |
| 69 | 470 ohms. |

| Condensers: | Value |
|---|---|
| 71–73 | 500 mmf. |
| 74–76, 82, 83 | .001 mf. |
| 77–79, 86 | .1 mf. |
| 80 | .2 mf. |
| 81, 85, 87 | .01 mf. |
| 84 | .15 mf. |

| Tubes: | |
|---|---|
| V1–V3, V5 | #5696 Thyratron. |
| D1–D8 | NE 81 gas diode. |
| (V4A, V4B) | 12AU7. |

Thus it will be seen that an underweight, add weight, pass, and overweight reject system is provided, which requires no classifying relays, since the classifying is performed by interacting glow tube and thyratron circuits. This makes for extreme reliability and dependability without the disadvantages of contact deterioration, contact sticking and the like, associated with relays. Similarly, the control circuit for the thyratron of the supplementing mechanism has been rendered relatively independent of mechanical variations in, or erratic mechanical operation of the dough supplementing device.

Throughout the specification, references have been made to tubes V1, V2, V3 and V5 as being "thyratrons," which are gas tubes that are normally held cut off by a negative grid bias, but with the grids losing control when the tubes fire in response to a positive grid signal. Tubes having this mode of operation may have heated cathodes, or they may have cold cathodes, the function of the tubes being unchanged. Accordingly, in the interest of simplicity, when the word "thyratron" appears in the appended claims, it is intended to include a grid controlled hot or cold cathode gas type of tube. The glow tubes D1 to D8 are gas filled diodes having certain well known ionization and electron flow characteristics, a typical example being the well known neon glow tube. When these tubes are firing, they tend to maintain a constant voltage across their electrodes and have the additional characteristics mentioned, in that a voltage impressed on one of the electrodes in the form of a pulse appears on the other electrode as a change in voltage in the same direction and of the same polarity, so long as the pulse does not extinguish the tube. Thus when the appended claims employ the term "glow tube," devices having these characteristics are defined.

The invention having thus been described, what is claimed and desired to be protected by Letters Patent is:

1. A classifier circuit comprising first, second and third thyratron tubes, a plate load for each thyratron, a source of positive voltage connected to the plate loads of said thyratrons, means for biasing the cathodes of said thyratrons to ground, means for biasing the grids of said thyratrons to three progressively increasing negative cut-off voltages, means for supplying a positive voltage classifying signal to the grid of each thyratron, said signal voltages progressively increasing for progressive changes in the articles being classified, at least two control circuits, and a source of voltage that is negative relative to said positive voltage source; first and second transfer glow tubes each having one electrode connected between a plate and the associated plate load of said first and second thyratrons respectively, each of said transfer glow tubes having the other electrode connected to a different one of said control circuits, a third transfer glow tube having one electrode connected to said positive voltage source and having the other electrode arranged for connection to one of said control circuits; first, second and third pulse glow tubes connected respectively between said one electrode of each transfer glow tube and said source of negative voltage; first and second bypass glow tubes connected respectively to said one electrode of said second and third transfer glow tubes and to the cathodes of said first and third thyratrons; and pulse means for momentarily rendering more positive the negative voltage source for each of said pulse glow tubes, for firing only said first transfer glow tube when none of the thyratrons are firing, and for firing only said second transfer glow tube when only said first thyratron is fired, and for cutting off all of said transfer glow tubes when only said first and second thyratrons are fired, and for firing said third transfer glow tube when all of said thyratrons are fired.

2. A classifier circuit comprising first, second and third thyratron tubes, a plate load for each thyratron, source of positive voltage connected to the plate loads of said thyratrons, means for biasing the cathodes of said thyratrons to ground, means for biasing the grids of said thyratrons to three progressively increasing negative cut-off voltages, means for supplying a positive voltage classifying signal to the grid of each thyratron, said signal voltages progressively increasing for progressive changes in the articles being classified, at least two control circuits, and a source of voltage that is negative relative to said positive voltage source; first and second transfer glow tubes each having one electrode connected between a plate and the associated plate load of said first and second thyratrons respectively, each of said glow tubes having the other electrode connected to a different one of said control circuits, a third transfer glow tube having one electrode connected to said positive voltage source and having the other electrode arranged for connection to one of said control circuits; first, second and third pulse glow tubes connected respectively between said one electrode of each transfer glow tube and said source of negative voltage; first and second bypass glow tubes connected respectively to said one electrode of said second and third transfer glow tubes and to the cathodes of said first and third thyratrons; a light sensitive circuit comprising a phototube, a light source, and a combined phototube amplifier and internal timing circuit; switch means operated by said amplifier, one contact of said switch means being connected to ground and the other contact being connected through a condenser to said source of negative voltage, said switch means being closed when the beam from said light source is uninterrupted, interruption of said light source by an article under classification causing said amplifier and timing circuit to first open said switch and to then close said switch after elapse of a predetermined time for applying a positive pulse to the electrodes of said glow tubes that are connected to the negative voltage source, said pulse firing only said first transfer glow tube when none of the thyratrons are firing, and firing only said second transfer glow tube when only said first thyratron is fired, and cutting off all of said transfer glow tubes when only said first and second thyratrons are fired, and firing said third transfer glow tube when all of said thyratrons are fired.

3. A classifier circuit comprising first, second and third thyratron tubes, a plate load for each thyratron, source of positive voltage connected to the plate loads of said thyratrons, means for biasing the cathodes of said thyratrons to ground, means for biasing the grids of said thyratrons to three progressively increasing negative cutoff voltages, means for supplying a positive voltage classifying signal to the grid of each thyratron, said signal voltages progressively increasing for progressive changes in the articles being classified, at least two control circuits, and a source of voltage that is negative relative to said positive voltage source; first and second transfer glow tubes each having one electrode connected between a plate and the associated plate load of said first and second thyratrons respectively, each of said transfer glow tubes having the other electrode connected to a different one of said control circuits, a third transfer glow tube having one electrode connected to said positive voltage source and having the other electrode arranged for connection to one of said control circuits; first, second and third pulse glow tubes connected respectively between said one electrode of each transfer glow tube and said source of negative voltage; first and second bypass glow tubes connected respectively to said one electrode of said second and third transfer glow tubes and to the cathodes of said first and third thyratrons; switch means for momentarily rendering more positive the negative voltage source for each of said pulse glow tubes, for firing only said first transfer glow tube when none of the thyratrons are firing, and for firing only said second transfer glow tube when only said first thyratron is fired, and for cutting off all of said transfer glow tubes when only said first and second thyratrons are fired, and for firing said third transfer glow tube when all of said thyratrons are fired; and a light source, a phototube, amplifier and delay circuit, said amplifier and delay circuit actuating said switch means a predetermined length of time after an article under classification interrupts the light beam to said phototube.

4. Weight correcting apparatus comprising an article weight supplementing device, means for producing a weight supplementing signal when the article weight is of a predetermined value, relay means for starting and stopping said supplementing device, a monostable multivibrator connected to said weight supplementing signal producing means, a grid controlled gas trigger tube having its grid connected to the normally non-conducting section of said multivibrator, said relay means having one coil terminal connected to the plate of said gas tube, a source of positive voltage connected to the other coil terminal, a normally open switch having one contact connected to ground, a pulse condenser and a current limiting resistor connected between the plate of said gas tube and the other contact of said switch, a charging condenser and a resistor connected between ground and the other terminal of said relay coil, said charging condenser also being connected to said pulse condenser, and means mechanically connected to said supplementing device for closing said switch near the end of a supplementing cycle and then opening said switch as said device completes a supplementing cycle in response to said weight supplementing signal, opening of said switch causing said charging condenser to bring the switch connected plate of said pulse condenser to said source voltage, closing of said switch grounding said pulse condenser to extinguish said gas tube, said pulse condenser charging and causing plate voltage on said gas tube to become reestablished in case said switch is left in the closed position upon completion of a supplementing cycle, so that a new cycle can be initiated upon receipt of the next weight supplementing signal.

5. Weight correcting apparatus comprising means for producing weight correction signals, an article weight supplementing device, relay means for starting and stopping said supplementing device, control tube means connected to said weight correction signal producing means, a grid controlled gas trigger tube having its grid connected to said control tube means for initiating firing of said gas tube when an article is of a predetermined weight, said relay means having one coil terminal connected to the plate of said gas tube, a source of positive voltage connected to the other coil terminal, a normally open switch having one contact connected to ground, a pulse condenser and a current limiting resistor connected between the plate of said gas tube and the other contact of said switch, a charging condenser and a resistor connected between ground and the other terminal of said relay coil, said charging condenser also being connected to said pulse condenser, and means mechanically connected to said supplementing device for closing said switch near the end of a supplementing cycle and then opening said switch as said device completes a supplementing cycle in response to said weight correction signal, opening of said switch causing said charging condenser to bring the switch connected plate of said pulse condenser to said source voltage, closing of said switch grounding said pulse condenser to extinguish said gas tube, said pulse condenser charging and causing plate voltage on said gas tube to become re-established in case said switch is left in the closed position upon completion of a supplementing cycle, so that a new cycle can be initiated upon receipt of the next weight correction signal.

6. Weight correcting apparatus comprising means for providing weight correction signals, an article weight supplementing device, relay means for starting and stopping said supplementing device, a monostable multivibrator connected to said correction signal providing means, a grid controlled gas trigger tube having its grid connected to the normally non-conducting section of said multivibrator, said relay means having one coil terminal connected to the plate of said gas tube, a providing means of positive voltage connected to the other coil terminal, a normally open switch having one contact connected to ground, a pulse condenser and a current limiting resistor connected between the plate of said gas tube and the other contact of said switch, a charging condenser and a resistor connected between ground and the other terminal of said relay coil, said charging condenser also being connected to said pulse condenser, and means mechanically connected to said supplementing device for closing said switch near the end of a supplementing cycle and then opening said switch as said device completes a supplementing cycle in response to said correction signal, opening of said switch causing said charging condenser to bring the switch connected plate of said pulse condenser to said source voltage, closing of said switch grounding said pulse condenser to extinguish said gas tube, said pulse condenser charging and causing plate voltage on said gas tube to become re-established in case said switch is left in the closed position upon completion of a supplementing cycle, so that a new cycle can be initiated upon receipt of the next correction signal.

References Cited in the file of this patent

UNITED STATES PATENTS

| | | |
|---|---|---|
| 2,568,255 | Schieser et al. | Sept. 18, 1951 |
| 2,688,441 | Merrill et al. | Sept. 7, 1954 |
| 2,688,458 | Schieser et al. | Sept. 7, 1954 |
| 2,712,408 | Weber | July 5, 1955 |
| 2,901,209 | Bardy et al. | Aug. 25, 1959 |